(12) United States Patent
Horikoshi

(10) Patent No.: US 9,880,333 B2
(45) Date of Patent: Jan. 30, 2018

(54) DISPLAY DEVICE, DISPLAY METHOD, AND MANUFACTURING METHOD OF COMPENSATION MEMBER

(71) Applicant: Sony Corporation, Tokyo (JP)

(72) Inventor: Ryoko Horikoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/456,970

(22) Filed: Aug. 11, 2014

(65) Prior Publication Data
US 2015/0062701 A1 Mar. 5, 2015

(30) Foreign Application Priority Data

Sep. 2, 2013 (JP) ................................. 2013-181230

(51) Int. Cl.
*G02B 5/30* (2006.01)
*G03B 21/20* (2006.01)

(52) U.S. Cl.
CPC .......... *G02B 5/3083* (2013.01); *G02B 5/3016* (2013.01); *G03B 21/2073* (2013.01)

(58) Field of Classification Search
CPC ....... G02B 5/3016; G02B 5/3083; G02B 5/32
USPC ..... 359/489.02, 489.03, 489.05, 489.06, 900
See application file for complete search history.

(56) References Cited

U.S. PATENT DOCUMENTS

| | | | | |
|---|---|---|---|---|
| 2,473,857 A * | 6/1949 | Burchell | ................. | 359/486.03 |
| 3,052,152 A * | 9/1962 | Koester | ............. | G02B 21/0092 359/386 |
| 3,431,044 A * | 3/1969 | Clark | .................... | G02B 27/288 359/489.19 |
| 3,497,979 A * | 3/1970 | Buitkus | ................... | G09F 13/34 359/486.03 |
| 3,538,322 A * | 11/1970 | Arsem | ................... | G02B 27/28 359/486.03 |
| 3,904,267 A * | 9/1975 | de Veer | .................. | G02B 21/14 359/371 |
| 4,902,112 A * | 2/1990 | Lowe | .................... | G02B 27/281 351/49 |
| 6,191,880 B1 * | 2/2001 | Schuster | ............. | G02B 5/3083 359/237 |
| 6,368,760 B1 * | 4/2002 | Nishiguchi | ....... | G02F 1/133528 252/585 |
| 6,734,936 B1 * | 5/2004 | Schadt | ..................... | G02B 5/30 349/117 |
| 6,829,041 B2 * | 12/2004 | Unno | .................. | G03F 7/70966 349/120 |
| 6,844,915 B2 * | 1/2005 | Owa | ..................... | G03F 7/70225 355/53 |
| 6,844,972 B2 * | 1/2005 | McGuire, Jr. | ........... | G02B 1/08 250/330 |
| 7,031,069 B2 * | 4/2006 | Gruner | ................ | G03F 7/70058 359/489.03 |

(Continued)

FOREIGN PATENT DOCUMENTS

JP 2011033897 * 2/2011

*Primary Examiner* — Ricky D Shafer
(74) *Attorney, Agent, or Firm* — Wolf, Greenfield & Sacks, P.C.

(57) ABSTRACT

There is provided a display device including a lens which guides light from a light source to a display surface, and a compensation member, having an inside surface opposite to a lens surface of the lens divided into a plurality of two-dimensional regions, in which a direction of an advance axis or a delay axis is controlled for each of the regions.

9 Claims, 5 Drawing Sheets

(56) References Cited

U.S. PATENT DOCUMENTS

| | | | | |
|---|---|---|---|---|
| 2001/0019404 A1* | 9/2001 | Schuster | ................ | G02B 17/08 355/67 |
| 2007/0183017 A1* | 8/2007 | Hembd | ................... | G02B 1/08 359/251 |
| 2010/0085495 A1* | 4/2010 | Katayama | ............ | G11B 7/1369 349/2 |

\* cited by examiner

FIG. 4

|  | BIREFRINGENCE PROPERTIES OF PROJECTION LENS | BIREFRINGENCE PROPERTIES OF COMPENSATION MEMBER |
|---|---|---|
| CASE 1 | POSITIVE BIREFRINGENCE PROPERTIES | POSITIVE BIREFRINGENCE PROPERTIES |
| CASE 2 | NEGATIVE BIREFRINGENCE PROPERTIES | NEGATIVE BIREFRINGENCE PROPERTIES |
| CASE 3 | POSITIVE BIREFRINGENCE PROPERTIES | NEGATIVE BIREFRINGENCE PROPERTIES |
| CASE 4 | NEGATIVE BIREFRINGENCE PROPERTIES | POSITIVE BIREFRINGENCE PROPERTIES |

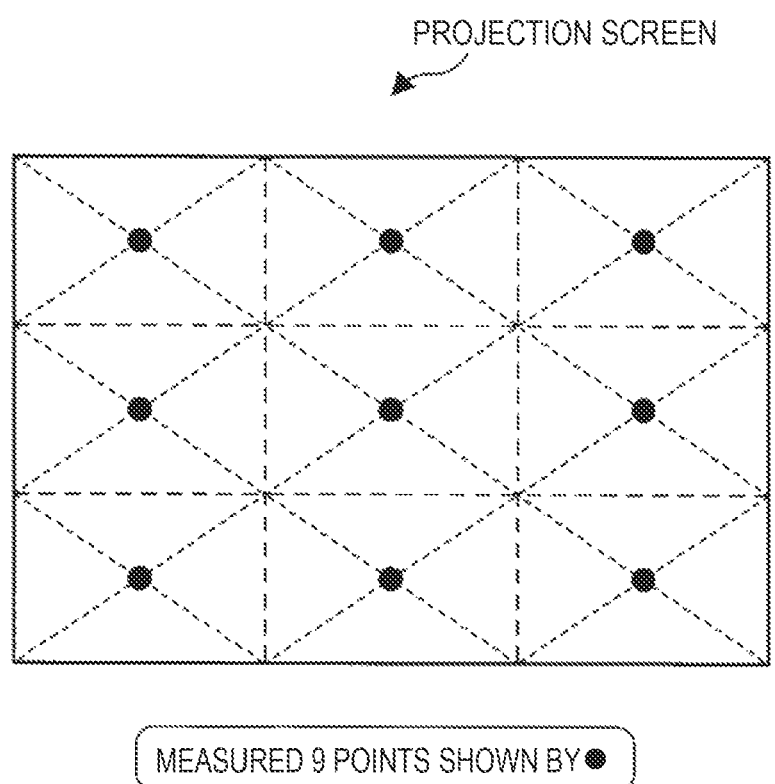

DISPLAY DEVICE, DISPLAY METHOD, AND MANUFACTURING METHOD OF COMPENSATION MEMBER

CROSS REFERENCE TO RELATED APPLICATIONS

This application claims the benefit of Japanese Priority Patent Application JP 2013-181230 filed Sep. 2, 2013, the entire contents of which are incorporated herein by reference.

BACKGROUND

The present disclosure relates to a display device, a display method, and a manufacturing method of a compensation member.

A projector device such as that disclosed in JP 2012-4009A is one type of display device which displays projection images. Further, in recent years, along with the development of technology, attempts have been made to project three-dimensional images by using a projector device.

Here, there are time-division systems, color separation systems, polarized light systems or the like as systems which project three-dimensional images by using a projector device, and a polarized light system with beautiful color reproduction has been adopted, in which a three-dimensional image can be seen by using inexpensive glasses, when used for educational purposes or in a large-sized room. Further, more inexpensive products have been sought after which further miniaturize the projector device itself. Based on such a situation, the design of a projection lens used in the projector device will become more complex, and in addition, in order to reduce the material costs, a lens using plastic (a so-called plastic (resin) lens) has also been used.

SUMMARY

However, in such a plastic lens, distortions will easily occur in the process of molding, and polarized light controlled at the time when transmitted through the plastic lens will be disturbed, even if the polarized light guided to the plastic lens is controlled. As a result of the present inventors performing extensive examination with regards to such disturbances of polarized light, it has become obvious that such disturbances of polarized light are due to the birefringence properties of a plastic lens. Further, as a result of the present inventors performing further examination, it has become obvious that color irregularities are generated in an image which is finally projected, even if polarized light disturbed by being transmitted through a plastic lens has been corrected by a polarization plate.

Here, as technology which corrects the birefringence properties of a plastic lens, JP 2011-33897A discloses technology which arranges an anisotropic element for correcting the birefringence properties of a resin lens, following the resin lens, in an image forming device such as a laser printer. However, in the technology of JP 2011-33897A, the applied device is an image forming device, and it has been discovered by the present inventors that color irregularities are not able to be eliminated in an image which is finally projected.

In this way, in a display device which displays an object to be displayed such as an image, technology has been sought after capable of compensating for birefringence properties due to the lens used in the display device.

Accordingly, the present disclosure proposes a display device, a display method and a manufacturing method of a compensation member capable of compensating for birefringence properties due to the lens used in the display device, while controlling the generation of color irregularities.

According to an embodiment of the present disclosure, there is provided a display device including a lens which guides light from a light source to a display surface, and a compensation member, having an inside surface opposite to a lens surface of the lens divided into a plurality of two-dimensional regions, in which a direction of an advance axis or a delay axis is controlled for each of the regions.

According to another embodiment of the present disclosure, there is provided a display method including guiding light from a light source to a display surface by a lens, and compensating a phase difference occurring in the light due to a birefringence property of the lens, prior to the light reaching the display surface, by a compensation member, having an inside surface opposite to a lens surface of the lens divided into a plurality of two-dimensional regions, in which a direction of an advance axis or a delay axis is controlled for each of the regions.

According to still another embodiment of the present disclosure, there is provided a manufacturing method of a compensation member, the manufacturing method including dividing an inside surface opposite to a lens surface of a lens which guides light from a light source to a display surface into a plurality of two-dimensional regions, and controlling a direction of an advance axis or a delay axis for each of the regions, in a prescribed optical member.

According to yet another embodiment of the present disclosure, a compensation member, having an inside surface opposite to a lens surface is divided into a plurality of two-dimensional regions, in which a direction of an advance axis or a delay axis is controlled for each of the regions, compensates for a disturbance of polarized light due to birefringence properties of the lens.

According to one or more of embodiments of the present disclosure such as described above, it is possible to compensate for birefringence properties due to the lens used in the display device, while controlling the generation of color irregularities.

BRIEF DESCRIPTION OF THE DRAWINGS

FIG. 4 is an explanatory diagram for describing a relation between a projection lens and the compensation member of the display device according to this embodiment; and FIG. 5 is an explanatory diagram for describing a measurement method of luminance and color irregularities in an example embodiment.

DETAILED DESCRIPTION OF THE EMBODIMENT(S)

Figure 1:
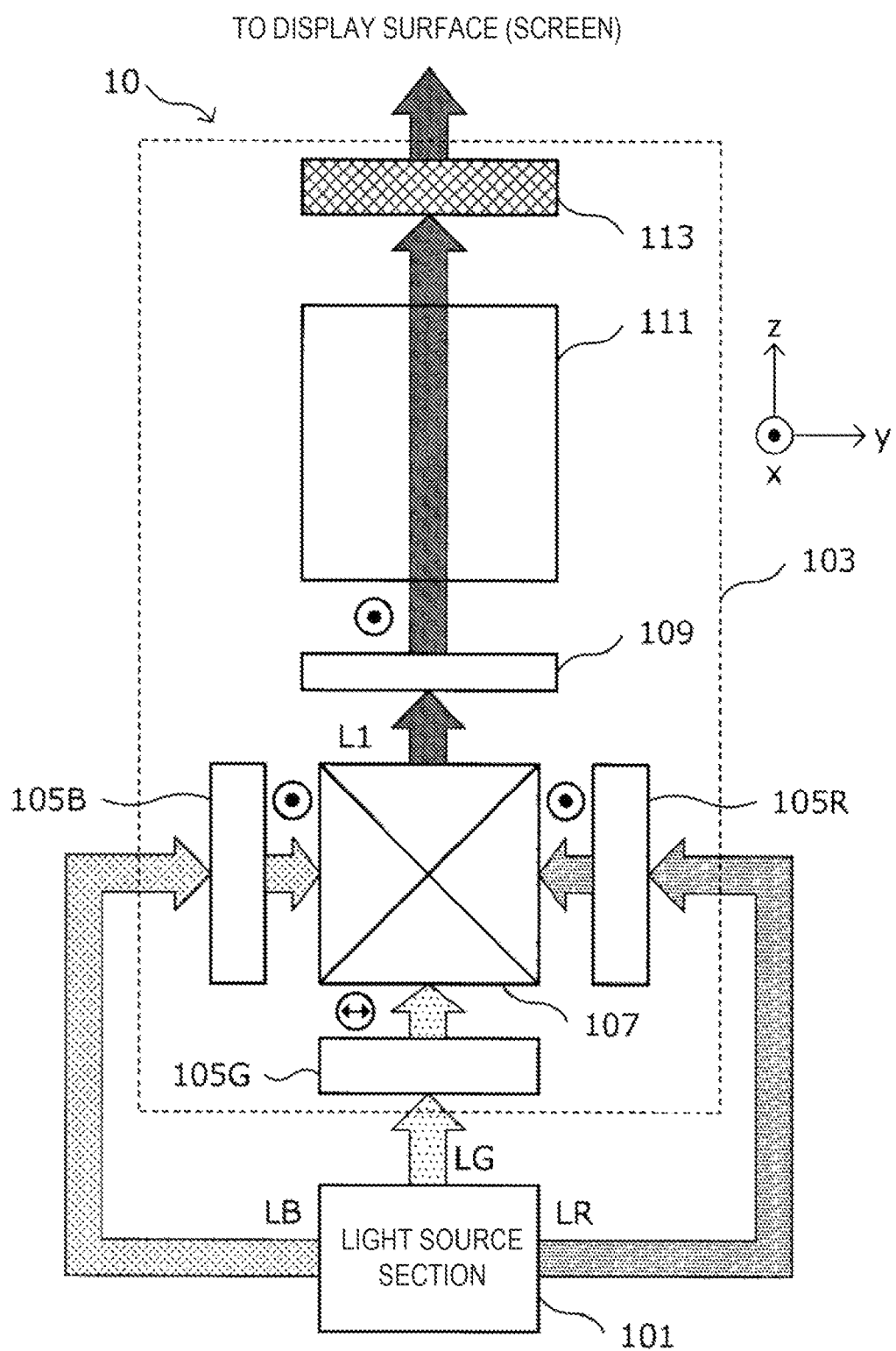
FIG. 1 is an explanatory diagram which schematically shows an example of an optical system of a display device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
(1) The first embodiment
(1-1) An example of the optical system included in the display device
(1-2) The compensation member
(1-3) Manufacturing method of the compensation member
(2) Conclusion
(3) Example embodiment The First Embodiment Hereinafter, a display device according to the present embodiment will be described in detail, by including an example of a projector device of a polarized light system capable of display three-dimensional images, which displays various types of images on a display surface such as a screen, as the display device according to a first embodiment of the present disclosure.

<An Example of the Optical System included in the Display Device>

Figure 2A:
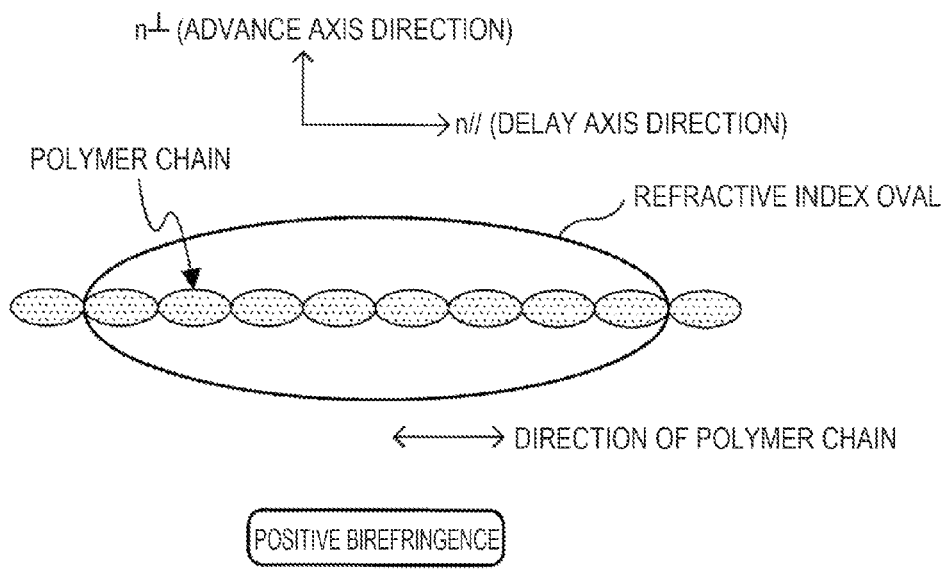
FIG. 2A is a schematic diagram for describing birefringence properties.
Figure 2B:
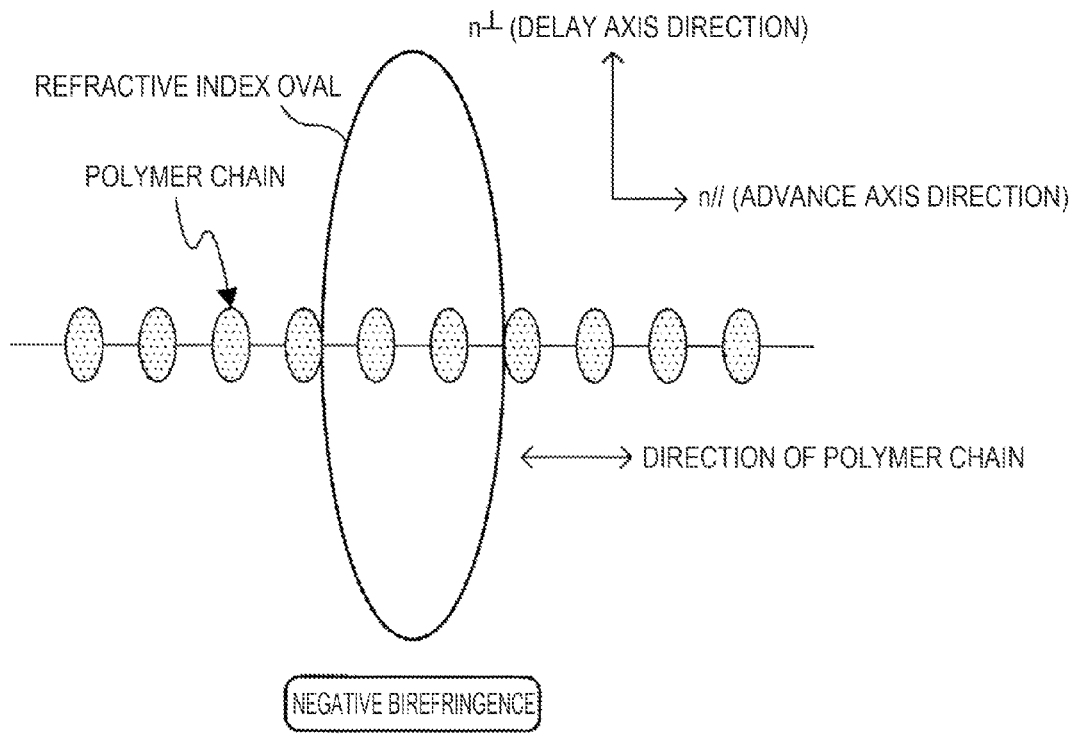
FIG. 2B is a schematic diagram for describing birefringence properties.

First, an example of an optical system included in a display device 10 according to the present embodiment will be described in detail with reference to FIG. 1 to FIG. 2B. FIG. 1 is an explanatory diagram which schematically shows an example of an optical system included in the display device 10 according to the present embodiment. FIG. 2A and FIG. 2B are explanatory diagrams for describing birefringence properties.

While the display device 10 according to the present embodiment has a cooling mechanism or the like for cooling heat generated by the optical system, other than the optical system shown in FIG. 1, FIG. 1 will show an example of the optical system included in the display device 10 according to the present embodiment.

As shown in FIG. 1, the optical system of the display device 10 according to the present embodiment mainly includes a light source section 101 and an image projection section 103.

The light source section 101 is a section which generates red light LR, green light LG and blue light LB used by the display device 10. The light source section 101 may include a power source such as a pressure mercury lamp which emits white light, and a spectroscopic mechanism which diffracts such white light into light of the above described three colors, or may have a mechanism which emits light of the above described three colors by combining solid light emitting elements such as semiconductor lasers or light emitting diodes. The configuration of the light source section 101 is not particularly limited in the optical system of the display device 10 according to the present embodiment, and it is possible to use various types of well-known light sources.

The red light LR, green light LG and blue light LB generated by the light source section 101 are each guided to the image projection section 103, by optical elements which include mirrors, lens or the like which are not shown in the figures.

The image projection section 103 is a section which generates image light by optically processing the light of three colors (red light LR, green light LG and blue light LB) emitted from the light source section 101, and enlarges and projects such image light onto a display surface such as a screen included on the outside. For example, as schematically shown in FIG. 1, this image projection section 103 mainly includes liquid crystal light modulation elements (hereinafter, called LCD panels) 105R, 105G and 105B, a prism 107, a selective ½ wavelength plate 109, a projection lens 111, and a compensation member 113.

For example, the three types of LCD panels 105R, 105G and 105B (hereinafter, there will be cases where they are collectively called an LCD panel 105) are constituted by transmissive type LCD panels. The LCD panel 105 transmits or cuts off incident light to the panel with liquid crystal units, by controlling the orientation of liquid crystal molecules enclosed in liquid crystal cells (not shown in the figures), based on prescribed drive signals from a panel drive section (not shown in the figures). In this way, light incident to the panel is modulated. Afterwards, the LCD panels 105 each emit light of modulated prescribed wavelengths (modulated light) to the prism 107.

Here, as shown in FIG. 1, for example, the LCD panel 105R on which red light LR is incident, and the LCD panel 105B on which blue light is incident, are arranged so that the light emission surfaces of each panel are opposite to each other via the prism 107. Further, the LCD panel 105G on which green light LG is incident is arranged in a direction which is orthogonal to the opposing direction of the LCD panel 105R and the LCD panel 105B.

Further, the polarized light direction of the modulated light of three colors incident on the prism 107 is controlled by polarization filters or the like which are not shown. For example, in the optical system shown in FIG. 1, the modulated light of red light emitted from the LCD panel 105R and the modulated light of blue light emitted from the LCD panel 105B, such as shown in the middle of the figure, are each controlled so as to become polarized light (that is, S polarized light) in which the x-axis direction within FIG. 1 is set as a vibration direction when incident on the prism 107. Further, the green modulated light emitted from the LCD panel 105G is controlled so as to become polarized light (that is, P polarized light) in which the y-axis direction within FIG. 1 is set as a vibration direction when incident on the prism 107.

The prism 107 multiplexes the modulated light controlling the polarized light direction, which has been emitted from the LCD panels 105R, 105G and 105B, and emits the obtained multiplexed light (that is, image light L1). The image light L1 emitted from the prism 107 is guided to the selective ½ wavelength plate 109 included on the optical path following the prism 107.

Here, the LCD panels 105 and the prism 107 according to the present embodiment are not particularly limited, and it is possible to arbitrarily use well-known LCD panels and prisms.

The selective ½ wavelength plate 109 is a polarized light rotation plate, which causes the polarized light direction of polarized light of a specific wavelength band to be rotated 90°, from among the incident light. In the image projection section 103 according to the present embodiment shown in FIG. 1, the red color component and the blue color component become S polarized light, and the green color component becomes P polarized light, from among the image light L1 emitted from the prism 107. Here, the polarized light direction of the green color component is rotated 90°, and is converted into S polarized light, by having the image light L1 incident on the selective ½ wavelength plate 109. In this way, as shown within FIG. 1, the image light L1 emitted from the selective ½ wavelength plate 109 becomes image light constituted of an S polarized light component. The image light L1, in which the polarized light directions emitted from the selective ½ wavelength plate 109 have been gathered, is guided to the projection lens 111 included afterwards.

Note that, the selective ½ wavelength plate 109 according to the present embodiment is not particularly limited, and it is possible to arbitrarily use a well-known wavelength selective polarized light rotator.

The projection lens 111 is a lens which enlarges and projects the incident image light L1 onto an outside screen (not shown in the figures) functioning as a display surface. Note that, while FIG. 1 illustrates the projection lens 111 using one lens, the projection lens 111 may be constituted from one lens, or may be a lens group constituted by a plurality of lenses.

As described above, in recent years, in order to attain miniaturization of the display device 10, a short focus lens, an extremely short focus lens or the like is implemented, the design of the projection lens 111 becomes more complicated, and many spherical lenses or the like are used. In addition, in the case where lowering the cost of the display device 10 is also considered, in order to implement the projection lens 111 which has been made complicated, a so-called plastic (resin) lens is often used by itself or a plastic lens is often used by combining with a so-called glass lens. While a plastic lens is formed by injecting resin into a mold formed corresponding to the shape of a lens to be achieved, it is known that distortions will easily occur at the time when forming such a lens.

In more detail, by injecting resin which becomes the material of the plastic lens from an injection port of a mold, the resin is radially dispersed, and a polymer chain of the resin is distributed in a prescribed direction. In such a distribution state, there is a difference between a refractive index $n_{//}$ of a lens for linearly polarized light emitting light in a distribution direction of the polymer chain, and a refractive index $n\perp$ of a lens for linearly polarized light emitting light in a direction orthogonal to the distribution direction. As a result of this, the formed plastic lens has birefringence properties, and such birefringence properties function as distortions. The size of birefringence properties occurring as a result of formation is represented by $\Delta n = n_{//} - n\perp$.

Here, as schematically shown in FIG. 2A, birefringence properties of the case where $n_{//} > n\perp$ in a refractive index oval and $\Delta n$ is positive will be called a "positive birefringence". Further, as schematically shown in FIG. 2B, birefringence properties of the case where $n_{//} < n\perp$ in a refractive index oval and a $\Delta n$ is negative will be called a "negative birefringence". Whether the formed plastic lens shows a positive or negative birefringence properties will depend on the resin material which is used.

When light in which the polarized light has been controlled (for example, the image light L1 in the present embodiment) is incident on a plastic lens which shows such birefringence properties, polarized light of the image light L1 will be disturbed, due to differences of the refractive index such as described above, and a phase difference will occur in the light transmitted through the lens. As a result of this, in particular, in the case where the display device 10 is used with the purpose of projecting a stereoscopic image using a polarized light system, cases will occur in which a projection image is not recognized as a stereoscopic image.

In this way, there is a correlation between the size of birefringence properties and the size of a phase difference generated in the transmitted light, and the size of birefringence properties is capable of being represented by the size of a phase amount standardized by wavelength. In more detail, in the case where the phase difference amount measured by using light of a wavelength of λ nm is θ°, the size of the birefringence amount will be represented by $(\theta \times \lambda / 360)$ [units: nm].

In the case where a polarized light plate is inserted in order to compensate for such disturbances of polarized light, and the disturbed polarized light is gathered again, the light of an absorption axis direction of the polarized light plate will be cut, and therefore a decrease in the light amount will occur for the light transmitted through the polarized light plate in a state in which the polarized light is disturbed, and the light will become darker. Further, since there will be a difference in the disturbance of polarized light according to the wavelength, the amount of light absorbed by the polarized light plate will be different for each wavelength, and luminance irregularities will appear by becoming color irregularities. As a result of this, harsh color irregularities will be generated on the screen.

Accordingly, as a result of the present inventors performing extensive examination to eliminate such a phenomenon, a compensation member has been conceived which is capable of compensating for the above described phenomenon due to birefringence properties of the projection lens 111, and as shown in FIG. 1, such a compensation member is set following the projection lens 111.

The compensation member 113 is an optical member, which is set on the optical axis following the projection lens 111, having a function which compensates for disturbances of polarized light of the image light L1 due to birefringence properties of the projection lens 111. Disturbances of polarized light are compensated for in the image light L1, in which the polarized light has been disturbed by transmitting through the projection lens 111, by transmitting though the compensation member 113, and the image light L1 is guided to the screen.

Note that, a description of the compensation member 113 according to the present embodiment will be described in detail again hereinafter.

Heretofore, an example of the entire configuration of the optical system of the display device 10 according to the present embodiment has been simply described with reference to FIG. 1 to FIG. 2B.

<The Compensation Member 113>

Figure 3:
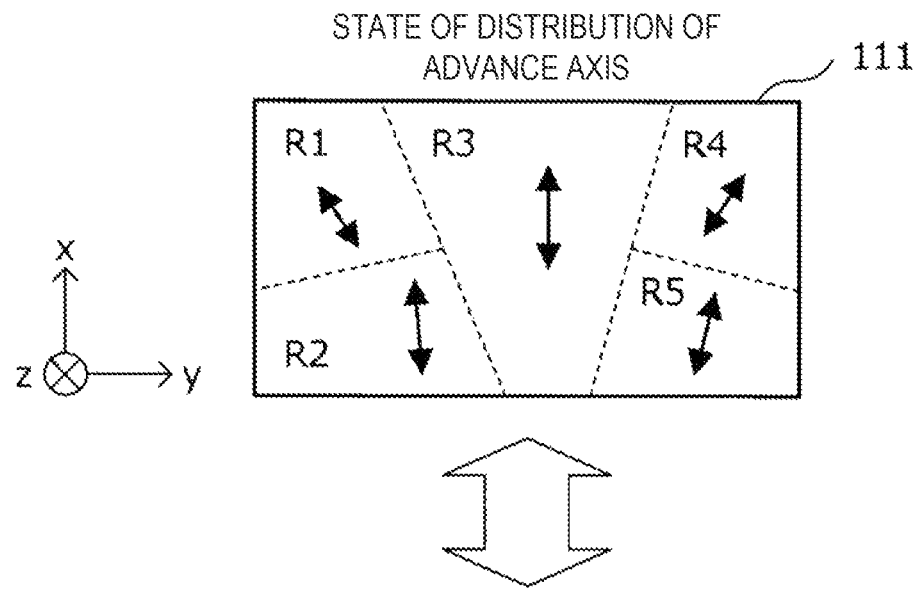
FIG. 3 is an explanatory diagram for describing a compensation member of the display device according to this embodiment.

To continue, the compensation member 13 included in the display device 10 according to the present embodiment will be described in detail with reference to FIG. 3 and FIG. 4. FIG. 3 is an explanatory diagram for describing the compensation member of the display device according to the present embodiment, and FIG. 4 is an explanatory diagram for describing a relation between a projection lens and the compensation member of the display device according to the present embodiment.

As described above, the compensation member 113 according to the present embodiment is an optical member which compensates for disturbances of polarized light of the image light L1 due to birefringence properties of the projection lens 111. In more detail, the compensation member 113 according to the present embodiment is handled by dividing an inside surface, which is opposite to a lens surface of the projection lens 111, into a plurality of two-dimensional regions, and compensates for disturbances of polarized light due to birefringence properties of the projection lens 111, for each of these plurality of regions.

Hereinafter, a method which compensates for birefringence properties of the projection lens 111, upon two-dimensionally dividing the lens surface of the compensation member 113, will be described in detail.

As described previously, in the case where a lens formed by an optical material having birefringence properties such as a plastic lens is used as the projection lens 111, disturbances of the polarized light state will be generated in accordance with the anisotropy of the refractive index in this lens. In such a lens, there is an axial direction (advance axis) in which the propagation velocity of light becomes faster (that is, the phase is advanced), and an axial direction (delay axis) in which the propagation velocity of light becomes slower (that is, the phase is delayed), due to anisotropy of the refractive index. Therefore, in order to compensate for birefringence properties of the projection lens 111, it is important to understand the state of birefringence properties of the projection lens 111 to be used (that is, how the advance axis or the delay axis is two-dimensionally distributed on the lens surface).

Accordingly, the state of birefringence of the projection lens 111 to be focused on is specified by a measurement apparatus (for example, a two-dimensional birefringence evaluation apparatus), which uses a well-known technique such as a rotation analysis method, a photoelastic modulation method, or a liquid crystal phase modulation method. In this way, as schematically shown in the upper stage of FIG. 3, it becomes possible to make a map of the state of distribution or the phase difference amount of the advance axis (and/or the delay axis) on the lens surface of the projection lens 111.

Usually, the distribution of the advance axis is not the same in a plastic lens or the like, and as shown in the upper stage of FIG. 3, is often divided into a plurality of regions (domains) having mutually similar axial directions. In the upper stage of FIG. 3, the direction of the advance axis is shown by arrows, and the lens surface of the projection lens 111 is shown divided into five regions from region R1 up to region R5.

The compensation member 113 according to the present embodiment two-dimensionally controls the state of distribution of the delay axis (or the advance axis) on an inside surface opposite to the projection lens 111 of the compensation member 113, based on the state of distribution of the advance axis (or delay axis) in the projection lens 111 such as shown in the above stage of FIG. 3. That is, as shown in the lower stage of FIG. 3, the surface of the compensation member 113 opposite to the lens surface of the projection lens 111 is collectively divided into a distribution of domains in the projection lens 111. In addition, in each domain, the direction of the delay axis (or the advance axis) is controlled, so that the direction of the advance axis of the projection lens 111 and the direction of the delay axis of the compensation member 113 are approximately parallel (or, the direction of the delay axis of the projection lens 111 and the direction of the advance axis of the compensation member 113 are approximately parallel).

For example, in the example shown in FIG. 3, the regions (domains) are divided into the five regions of region R1' to region R5', which are combined on the lens surface of the projection lens 111, at the surface opposite to the lens surface of the projection lens 111 in the compensation member 113, and are set so that the region R1 and the region R1', the region R2 and the region R2', the region R3 and the region R3', the region R4 and the region R4', and the region R5 and the region R5' are opposite to each other. In addition to this, birefringence properties are controlled in each of the regions R1' to R5', so that the direction of the advance axis of the projection lens 111 and the direction of the delay axis of the compensation member 113 approximately match each other in each of the regions.

Here, the axial direction in the projection lens 111 and the axial direction in the compensation member 113 may not completely match each other (that is, completely parallel) in each of the regions, or a prescribed error margin may occur. Further, the axial direction may be discontinuously switched at the interface between regions, or the direction of the advance axis (or the delay axis) may be continuously switched between regions.

Here, while the axis is continuously changed in one-dimensional in accordance with the main scanning direction (only the axis changes in the main scanning direction) in the technology disclosed in JP 2011-33897A, the direction of the axis is two-dimensionally controlled in the present embodiment, such as shown in FIG. 3, for example, and by dividing an inside surface of the compensation member 113 into a plurality of regions, compensation of distortions is performed in accordance with birefringence properties for each region. In the case where the axis is one-dimensionally distributed, and birefringence properties, that is, the phase difference amount, is continuously controlled, there will be cases where the phase difference amount can be simply calculated by using a Jones matrix such as described in JP 2011-33897A, or there will be cases where the phase difference amount can be compensated for without dividing the compensation member into a plurality of regions such as in the present embodiment. However, in the case where the axis is two-dimensionally changed such as in the present embodiment, and the projection lens to be compensated for uses a plurality of resin lenses, there will be a birefringence amount in which a plurality of distortions originating in these plurality of resin lenses are synthesized, and therefore will not be limited to a continuous distribution. Therefore, performing compensation by dividing regions such as in the present embodiment will become important.

Further, while there is a concern of the propriety of compensation at the portion where the axial direction becomes discontinuous, it is possible to perform successful compensation, by causing the position of the discontinuous interface portion and the interface position of the region division of the compensation plate to match each other, even if there is a portion where the axial direction is discontinuous. In contrast to this, when the position of the interface of the axial direction is shifted, the position at which the shift has occurred will become a region which is not compensated, and it therefore becomes obvious that this position will be displayed on the display screen by becoming a dark shadow.

Note that, while FIG. 3 illustrates a case where the lens surfaces of the projection lens 111 and the compensation member 113 are divided into five regions, the number of regions on these lens surfaces is not limited to five, and may be a number of regions of two to four, or may be a number of regions of six or more. Further, when considering easier manufacturing of the compensation member according to the present embodiment, it is desirable to have a small number of regions. When considering that the resin used for manufacture is inserted from an insertion port and is symmetrically spread out, when manufacturing a plastic lens, it can be considered that the distribution of the advance axis (or the delay axis) will become symmetrical with respect to the injection port. Accordingly, by considering the injection direction of resin, and four regions virtually divided of both sides of this injection direction, it is desirable for the number of regions to be nine regions or less.

By two-dimensionally controlling birefringence properties of the compensation member 113 such as described above, in the example shown in FIG. 3, for example, the image light L1, in which the phase transmitted through the region R1 of the projection lens 111 has advanced a prescribed amount, will have a phase which is delayed a prescribed amount due to being transmitted through the corresponding region R1' of the compensation member 113. As a result of this, the phase difference occurring in the image light L1 transmitted through both the projection lens 111 and the compensation member 113 will be suppressed. In this way, in the display device 10 according to the present embodiment, it becomes possible to obtain an image with no bright irregularities, while suppressing the loss of the light amount of the image light L1.

In this way, the compensation member 113 according to the present embodiment two-dimensionally controls the direction of the anisotropy axis on the lens surface of the compensation member 113 for each of the regions, in accordance with the direction of distortions according to birefringence properties occurring in the entire projection lens 111. Here, while a case has been described in the above described embodiment in which the direction of the advance axis/delay axis of the projection lens 111 and the direction of the delay axis/advance axis of the compensation member 113 approximately match each other, it is more desirable to control the size of the phase difference amount for each region in accordance with not just the direction of the advance axis and the delay axis, but additionally in accordance with birefringence properties. For example, in the case where a phase difference of +x occurs (the phase is advanced only x) in accordance with birefringence properties in the region R1 of the projection lens 111 shown in FIG. 3, such a technical idea will have the meaning of controlling the phase difference amount occurring at the region R1' of the compensation member 113 to −x. In this way, it becomes possible to cancel the phase difference amount resultantly occurring in the image light L1 transmitted through these regions. As a result of this, it becomes possible to obtain an image with less color irregularities, while further controlling the loss of the light amount, when compared to the case where only the direction of the anisotropy axis is controlled.

Here, the combination of the characteristics of birefringence properties of the projection lens 111 and the characteristics of birefringence properties of the optical member used for the compensation member 113 is not particularly limited, and it is possible to compensate for disturbances of polarized light due to birefringence properties of the projection lens 111, for any type of combination. For example, the projection lens 111 and the compensation member 113 may have birefringence properties with characteristics identical to each other, such as shown as case 1 or case 2 in FIG. 4, or may have birefringence properties with characteristics opposite to each other, such as shown as case 3 or case 4 in FIG. 4.

When considering optical compensation, there is a way of thinking in which the phase difference is cancelled at the advance axis and the delay axis. The examples shown in case 1 and case 2 of FIG. 4 are examples which cancel a phase difference, and compensate for birefringence properties, by causing the advance axis and the delay axis to be orthogonal to each other. That is, in the examples shown in case 1 and case 2 of FIG. 4, different axes are overlapping each other, by causing the same axes to be orthogonal to each other.

On the other hand, because the shape of each of the refractive index ovals are those shown in FIG. 2A and FIG. 2B, the examples shown in case 3 and case 4 of FIG. 4 can also cancel the phase difference by causing the delay axis and the advance axis to be orthogonal to each other. When specifically considering being applied to case 3, the direction of the advance axis of the compensation member, which has negative birefringence properties, will be matched to the direction of the delay axis of the lens, which has positive birefringence properties.

Note that, in the case of a combination of different characteristics such as in case 3 and case 4 of FIG. 4, a compensation effect will become superior with respect to diagonal light, compared to the methods of case 1 and case 2. Here, diagonal light has the meaning of light which is incident by having some angle of incidence, with respect to the normal direction of the plane of incidence of the projection lens 111 and the compensation member 113. In this way, it is possible for the projection lens 111 to perform an appropriate compensation process, even if it is a projection lens having a short focal length (a so-called short focus projection lens) which implements wide-angle projection.

Note that, the optical material used for the compensation member 113 is not particularly limited, and may be arbitrary selected from well-known materials, in accordance with birefringence properties and the size of a refractive index to be obtained. As such an optical material, various types of cyclic olefin copolymers (COP), polycarbonates (PC), various types of liquid crystalline polymers or the like can be included, for example, as an optical material having positive birefringence properties, and polyethylene methacrylate (PMMA), polystyrene (PS) or the like can be included, for example, as an optical material having negative birefringence properties. Further, it is also possible to use various types of crystals such as sapphires, multilayer films or the like as the optical material used for the compensation member 113.

Heretofore, the compensation member 113 according to the present embodiment has been described in detail with reference to FIG. 3 and FIG. 4.

Note that, while the optical system shown in FIG. 1 illustrates a case where the compensation member 113 is set following the projection lens 111, the setting position of the compensation member 113 according to the present embodiment is not limited to a position following the projection lens 111. If direction control of the anisotropy axis is performed in the compensation member 113, in accordance with the direction of the anisotropy axis of the projection lens 111 such as described above, the compensation member 113 may be set before the projection lens 111.

<Manufacturing Method of the Compensation Member>

Next, the manufacturing method of the compensation member 113 according to the present embodiment will be simply described.

The compensation member 113 according to the present embodiment is manufactured by dividing an inside surface opposite to the lens surface of the projection lens 111 in the optical material used as the compensation member 113 into a plurality of two-dimensional regions, and controlling the direction of an advance axis or a delay axis for each of these regions, based on birefringence properties of the lens (projection lens 111) which guides light from a light source to the display surface.

In more detail, when manufacturing the compensation member 113 according to the present embodiment, first, the state of a birefringence index of the projection lens 111 used by the display device 10 is measured by using a well-known measurement apparatus. In this way, it become possible to specify birefringence properties of the projection lens 111 (positive birefringence properties or negative birefringence properties), and to specify the state of distribution of the anisotropy axis (advance axis/delay axis) on the lens surface. To continue, the lens surface of the projection lens 111 is divided into a plurality of regions in which the direction of the anisotropy axis becomes approximately the same, based on the obtained measurement result. In this way, a distribution map of the anisotropy axis such as that shown in the upper stage of FIG. 3 can be obtained.

Here, in the case where the projection lens 111 is formed from a plurality of lenses, while it is desirable for the measurement of birefringence properties such as described above to be executed as an entire lens group, the measurement may be performed by focusing on only the lens which asserts an influence on the birefringence properties from among the plurality of lenses constituting the lens group.

Next, an inside surface of the compensation member 113 opposite to the lens surface of the projection lens 111 is divided into a plurality of regions based on the obtained distribution map, and a control direction of the anisotropy axis in each of the regions is specified. That is, a direction control map of the anisotropy axis on the lens surface of the compensation member 113 is specified, such as shown in the lower stage of FIG. 3, in accordance with the distribution map of the anisotropy axis of the projection lens 111.

To continue, a prescribed optical material is used, and the compensation member 113 is manufactured by a well-known method, while the direction of the anisotropy axis (advance axis/delay axis) is controlled for each of the regions.

The direction control method is not particularly limited, and it is possible to use a well-known method as the direction control method of the anisotropy axis of the compensation member 113. For example, a method which controls the distribution method of a plastic resin used in the manufacture of the compensation member 113 by electric field application, or a method in which the direction of the anisotropy axis has a combination of well-known materials, can be used as such a method.

For example, in the case where the compensation member 113 having positive birefringence properties is manufactured by using a liquid crystalline polymer, direction control of the anisotropy axis is possible by controlling the direction of an electric field applied in accordance with the above descried direction control map of the anisotropy axis. Further, for example, by using in combination with a method such as changing the density of the liquid crystalline polymers to be used for each region, it is possible to perform control of the phase difference amount in addition to direction control of the anisotropy axis.

Further, the compensation member 113 according to the present embodiment can be manufactured, by using commercially available adhesive tape (the long direction of the tape becomes the delay axis) which is known to function as a ½ wavelength plate of an a-plate (that is, having positive birefringence properties), and adhering such adhesive tape while changing the attachment direction for various types of well-known plates such as glass. At this time, control of the phase difference amount can be performed, by controlling the number of sheets of overlapping and adhered adhesive tape.

Further, in the case where the compensation member 113 having negative birefringence properties is manufactured by using crystals such as sapphires, the compensation member 113 according to the present embodiment can be manufactured by adhering (combining) crystals while paying attention to the direction of the anisotropy axis of the crystals.

Heretofore, a manufacturing method of the compensation member 113 according to the present embodiment has been simply described.

CONCLUSION

As described above, in the display device, display method and manufacturing method of a compensation member according to an embodiment of the present disclosure, the lens surface of a compensation member is divided into a plurality of regions, and control is performed so that the optical axis distributions on each of the regions are mutually different to the optical axis directions on the lens surface of an opposing projection lens. In this way, a phase difference due to the birefringence of the projection lens can be controlled, and birefringence properties due to this projection lens can be compensated for. As a result of this, the generation of color irregularities in the display surface is controlled, while preventing disturbances of polarized light in the light to be projected. Therefore, by using such a compensation member, the display device according to an embodiment of the present disclosure is capable of obtaining favorable three-dimensional images.

To continue, the display device and the display method according to an embodiment of the present disclosure will be specifically described while showing an example embodiment. Note that, the example embodiment shown hereinafter is merely one example of the display device and the display method according to an embodiment of the present disclosure, and it is needless to say that the display device and the display method according to an embodiment of the present disclosure is not limited to the following example embodiment.

Example Embodiment

A plastic lens which is actually commercially available is obtained, and the characteristics of such a plastic lens are measured with a commercially available birefringence distribution evaluation apparatus, and the polarity of the birefringence properties of this plastic lens and the state of this distribution are specified. As a result of this, it becomes obvious that the plastic lens to be focused on will have positive birefringence properties.

Accordingly, the compensation member 113 according to an embodiment of the present disclosure is manufactured while controlling the direction of an applied electric charge, by using a well-known liquid crystal polymer which shows positive birefringence properties. Note that, in such a compensation member 113, control of a phase difference amount in each region is not performed, and the application method of an electric field is controlled so that the direction of an advance axis of the plastic lens and the direction of a delay axis of the compensation member match each other.

Luminance and color irregularities on a projection screen of the projection light are measured by a well-known measurement device, for both the cases where the compensation member 113 manufactured such as described above is set or is not set following the plastic lens. Note that, the projection light incident on the above described plastic lens and compensation member 113 is generated by using a light source section unit used in a liquid crystal projector from Sony Corporation.

Note that, as schematically shown in FIG. 5, the measurement of luminance and color irregularities on the projection screen is performed by measuring nine points on the projection screen, and the color irregularities are evaluated by calculating a color difference (units: JND) based on measured X, Y and Z stimulus values.

As a result of this, a luminance ratio on the projection screen will be improved approximately 27%, when compared to the case of not setting the compensation member 113 according to an embodiment of the present disclosure. It is considered that this is due to an increase in the amount of light transmitted through the polarizing light plate, by setting the compensation member according to an embodiment of the present disclosure, in contrast to light being present which has been absorbed by a polarized light plate due to disturbed polarized light, in the case of not setting the compensation member.

Further, a color difference (units: JND) is calculated, based on the following Equation 11, by using a difference of measured stimulus values ($\Delta x$, $\Delta y$). Here, in the following Equation 11, the coefficients $g_{11}$, $g_{12}$ and $g_{22}$ are well-known coefficients which differ for each chromaticity point.

$$JND = \frac{1}{3} \times \sqrt{g_{11}\Delta x^2 + 2g_{12}\Delta x \Delta y + g_{22}\Delta y^2} \qquad \text{(Equation 11)}$$

As a result of this, in the case of not using the compensation member according to an embodiment of the present disclosure, the measured color irregularities will be 7.7 JND, and in contrast to this, in the case of using the compensation member according to an embodiment of the present disclosure, the measured color irregularities will be 3.1 JND. These color irregularities of 3.1 JND are numerical values which have the meaning of color irregularities which are able to be compensated up to a range capable of being sufficiently used, by combining with an electrical adjustment of the display device.

In this way, by using the compensation member according to an embodiment of the present disclosure, it becomes obvious that it is possible to compensate for birefringence properties due to the lens used in the display device, while controlling the generation of color irregularities.

Note that, while an example has been shown in the above described example embodiment which uses a compensation member having positive birefringence properties, in order to compensate for disturbances of polarized light due to the projection lens having positive birefringence properties, a similar result can be obtained, even in the case of compensating for disturbances of polarized light due to the projection lens having negative birefringence properties, by using a compensation member having negative birefringence properties, such as shown in case 2 of FIG. 4.

Further, it is considered that a result similar to that that of the example embodiment can also be obtained for the combination of different characteristics shown in case 3 or case 4 of FIG. 4.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A display device including:
a lens which guides light from a light source to a display surface; and
a compensation member, having an inside surface opposite to a lens surface of the lens divided into a plurality of two-dimensional regions, in which a direction of an advance axis or a delay axis is controlled for each of the regions.

(2) The display device according to (1),
wherein the direction of the advance axis or the delay axis of each region of the compensation member is controlled so as to become substantially parallel to a direction of an advance axis or a delay axis of the lens at a position of the lens surface opposite to the region.

(3) The display device according to (1) or (2),
wherein a phase difference amount for each of the regions is additionally controlled by the compensation member.

(4) The display device according to any one of (1) to (3),
wherein the lens and the compensation member have a birefringence property with a characteristic identical to each other.

(5) The display device according to any one of (1) to (3),
wherein the lens and the compensation member have a birefringence property with a characteristic opposite to each other.

(6) The display device according to any one of (1) to (5),
wherein the compensation member is formed by a liquid crystal polymer in which an orientation direction is controlled.

(7) The display device according to any one of (1) to (6),
wherein the lens is a projection lens which includes a lens formed by using plastic.

(8) The display device according to any one of (1) to (7),
wherein the display device is a display device of a polarized light system capable of displaying a three-dimensional image.

(9) A display method including:
guiding light from a light source to a display surface by a lens; and
compensating a phase difference occurring in the light due to a birefringence property of the lens, prior to the light reaching the display surface, by a compensation member, having an inside surface opposite to a lens surface of the lens divided into a plurality of two-dimensional regions, in which a direction of an advance axis or a delay axis is controlled for each of the regions.

(10) A manufacturing method of a compensation member, the manufacturing method including:
dividing an inside surface opposite to a lens surface of a lens which guides light from a light source to a display surface into a plurality of two-dimensional regions, and controlling a direction of an advance axis or a delay axis for each of the regions, in a prescribed optical member.

What is claimed is:
1. A display device comprising:
a lens which guides light from a light source to a display surface; and
a compensation member, having an inside surface opposite to a lens surface of the lens, the inside surface being divided into a plurality of two-dimensional regions, in which a direction of an advance axis or a delay axis is controlled for each region of the plurality of two-dimensional regions,
wherein the plurality of two-dimensional regions includes a first region separated from a second region by at least one first boundary and a third region separated from the first region and/or the second region by at least one second boundary that intersects the first boundary,
wherein the direction of the advance axis or the delay axis of each region of the plurality of two-dimensional regions of the compensation member is controlled so as to become substantially parallel to a direction of an advance axis or a delay axis of the lens at a position of the lens surface opposite to the each region.

2. The display device according to claim 1,
wherein a phase difference amount for each region of the plurality of two-dimensional regions is additionally controlled by the compensation member.

3. The display device according to claim 2,
wherein the lens and the compensation member have a birefringence property with a characteristic identical to each other.

4. The display device according to claim 2,
wherein the lens and the compensation member have a birefringence property with a characteristic opposite to each other.

5. The display device according to claim 1,
wherein the compensation member is formed by a liquid crystal polymer in which an orientation direction is controlled.

6. The display device according to claim 1,
wherein the lens comprises a projection lens formed by using plastic.

7. The display device according to claim 1,
wherein the display device is of a polarized light system capable of displaying a three-dimensional image.

8. A display method comprising:
guiding light from a light source to a display surface by a lens; and
compensating a phase difference occurring in the light due to a birefringence property of the lens, prior to the light reaching the display surface, by a compensation member, the compensation member having an inside surface opposite to a lens surface of the lens, the inside surface being divided into a plurality of two-dimensional regions, in which a direction of an advance axis or a delay axis is controlled for each of the regions,
wherein the plurality of two-dimensional regions includes a first region separated from a second region by at least one first boundary and a third region separated from the first region and/or the second region by at least one second boundary that intersects the first boundary,
wherein the direction of the advance axis or the delay axis of each region of the plurality of two-dimensional regions of the compensation member is controlled so as to become substantially parallel to a direction of an advance axis or a delay axis of the lens at a position of the lens surface opposite to the each region.

9. A manufacturing method of a compensation member, the manufacturing method comprising:
dividing an inside surface of the compensation member opposite to a lens surface of a lens, which guides light from a light source to a display surface, into a plurality of two-dimensional regions, and controlling a direction of an advance axis or a delay axis for each region of the plurality of two-dimensional regions,
wherein the plurality of two-dimensional regions includes a first region separated from a second region by at least one first boundary and a third region separated from the first region and/or the second region by at least one second boundary that intersects the first boundary,
wherein the direction of the advance axis or the delay axis of each region of the plurality of two-dimensional regions of the compensation member is controlled so as to become substantially parallel to a direction of an advance axis or a delay axis of the lens at a position of the lens surface opposite to the each region.

* * * * *